(12) United States Patent
Chang et al.

(10) Patent No.: US 12,471,794 B2
(45) Date of Patent: Nov. 18, 2025

(54) WEARABLE DEVICE WITH HEART RATE DETECTION, DYNAMIC HEART RATE DETECTION METHOD AND NON-TRANSITORY COMPUTER-READABLE STORAGE MEDIUM

(71) Applicant: Wistron Corporation, New Taipei (TW)

(72) Inventors: Hsuan-Tsung Chang, New Taipei (TW); Hao-Gong Chou, New Taipei (TW); Ching-An Cho, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 646 days.

(21) Appl. No.: 17/899,800

(22) Filed: Aug. 31, 2022

(65) Prior Publication Data

US 2023/0346235 A1 Nov. 2, 2023

(30) Foreign Application Priority Data

Apr. 29, 2022 (TW) .................................. 111116549

(51) Int. Cl.
*A61B 5/024* (2006.01)
*A61B 5/00* (2006.01)

(52) U.S. Cl.
CPC ........ *A61B 5/02438* (2013.01); *A61B 5/7203* (2013.01); *A61B 5/7253* (2013.01); *A61B 2562/0219* (2013.01)

(58) Field of Classification Search
CPC . A61B 5/02438; A61B 5/7203; A61B 5/7253; A61B 5/6802; A61B 5/7264; A61B 5/746; A61B 5/721; A61B 5/02416; A61B 2562/0219

See application file for complete search history.

(56) References Cited

U.S. PATENT DOCUMENTS

2019/0110755 A1 4/2019 Capodilupo et al.

FOREIGN PATENT DOCUMENTS

| CN | 103596491 A | 2/2014 |
|---|---|---|
| CN | 104207756 B | 2/2018 |
| CN | 106073737 B | 11/2018 |
| CN | 106333667 B | 7/2019 |

(Continued)

OTHER PUBLICATIONS

EESR dated Sep. 15, 2023, listed in correspondent European patent application No. 22204900.9.

(Continued)

*Primary Examiner* — Eric F Winakur
*Assistant Examiner* — Hy Khanh Doan
(74) *Attorney, Agent, or Firm* — McClure, Qualey & Rodack, LLP (57) ABSTRACT

A wearable device with heart rate detection includes a heart rate detection assembly and a processor. The heart rate detection assembly is configured to obtain a plurality of dynamic heart rate signals according to a default frequency. The processor includes a finite state machine and a storage. The storage is configured to store the plurality of dynamic heart rate signals, and the finite state machine determines a heart rate state according to a sampling parameter and the plurality of dynamic heart rate signals. The processor obtains a weight according to the heart rate state, and obtains a dynamic heart rate value according to the weight.

20 Claims, 9 Drawing Sheets

(56) References Cited

FOREIGN PATENT DOCUMENTS

| WO | 2018032042 A1 | 2/2018 |
| WO | 2020053858 A1 | 3/2020 |

OTHER PUBLICATIONS

Guo Jingbin et al:"An Effective Photoplethysmography Heart Rate Estimation Framework Integrating Two-Level Denoising Method and Heart Rate Tracking Algorithm Guided by Finite State Machine", IEEE Journal of Biomedic and Health Informatics, IEEE, Piscataway, NJ, USA, vol. 26, No. 8, Apr. 4, 2022 (Apr. 4, 2022), pp. 3731-3742, XP011917342, ISSN: 2168-2194, DOI: pp. 3731-3742, [retrieved on Apr. 5, 2022].

WEARABLE DEVICE WITH HEART RATE DETECTION, DYNAMIC HEART RATE DETECTION METHOD AND NON-TRANSITORY COMPUTER-READABLE STORAGE MEDIUM

CROSS-REFERENCE TO RELATED APPLICATION

This non-provisional application claims priority under 35 U.S.C. § 119(a) to Patent Application No. 111116549 filed in Taiwan, R.O.C. on Apr. 29, 2022, the entire contents of which are hereby incorporated by reference.

BACKGROUND

Technical Field

The present invention relates to a wearable device, and in particular, to a wearable device capable of detecting dynamic heart rate.

Related Art

With the rise of wearable devices, people have increasingly high functional requirements for wearable devices. Currently, there are products of wearable devices in combination with a heart rate detection function. After wearing a wearable device on the body, the user can detect a heart rate state in real time through the wearable device. In a normal use state, the wearable device detects heart rate signals of the human body in a static state and heart rate signals of the human body in activity. However, in response to the human body being in activity, heart rate signals detected by the wearable device include a large amount of motion noise, which seriously interferes with the interpretation of the heart rate. For the heart rate signals with the motion noise, the wearable device requires more complex calculations and needs to increase memory capacity to ensure normal operation of the complex calculations. As a result, the manufacturing costs are greatly increased. In addition, the excessively complex calculations also cause difficulties in calculating the heart rate.

SUMMARY

In view of this, in some embodiments, a wearable device with heart rate detection includes a heart rate detection assembly and a processor. The heart rate detection assembly is configured to obtain a plurality of dynamic heart rate signals according to a default frequency. The processor includes a finite state machine (FSM) and a storage, where the storage is configured to store the plurality of dynamic heart rate signals, and the finite state machine determines a heart rate state according to a sampling parameter and the plurality of dynamic heart rate signals. The processor obtains a weight according to the heart rate state, and obtains a dynamic heart rate value according to the weight. In some embodiments, the heart rate state includes a stable state, an alert state, a recovery state and an uncertain state.

In some embodiments, the finite state machine is configured to determine that the heart rate state is the stable state at an initial moment. In a case that the heart rate state is the stable state, in response to a heart rate variability being greater than or equal to a heart rate variability threshold, and the crest factor is greater than or equal to a crest factor threshold, the finite state machine determines that the heart rate state is the stable state. Otherwise, the finite state machine determines that the heart rate state is the alert state. The heart rate variability is a difference between a current dynamic heart rate value and a dynamic heart rate value at a previous moment.

In some embodiments, in a case that the heart rate state is the alert state, in response to the crest factor being less than the crest factor threshold, and an alert count value reaches an alert state count threshold, the finite state machine determines that the heart rate state is the uncertain state and resets the alert count value to zero. In response to the crest factor being greater than or equal to the crest factor threshold, the finite state machine determines that the heart rate state is the recovery state and resets the alert count value to zero. Otherwise, the finite state machine determines that the heart rate state is the alert state, and in response to the crest factor being less than the crest factor threshold, the alert count value is incremented by one.

In some embodiments, in a case that the heart rate state is the uncertain state, in response to the crest factor being greater than or equal to the crest factor threshold, and an uncertain count value reaches an uncertain state count threshold, the finite state machine determines that the heart rate state is the alert state and resets the uncertain count value to zero. in response to the crest factor being less than the crest factor threshold, the finite state machine determines that the heart rate state is the uncertain state and resets the uncertain count value to zero. Otherwise, the finite state machine determines that the heart rate state is the uncertain state, and in response to the crest factor being greater than or equal to the crest factor threshold, the uncertain count value is incremented by one.

In some embodiments, in a case that the heart rate state is the recovery state, in response to the crest factor being greater than or equal to the crest factor threshold, the heart rate variability is less than or equal to the heart rate variability threshold, and a recovery count value reaches a recovery state count threshold, the finite state machine determines that the heart rate state is the stable state and resets the recovery count value to zero. In response to the crest factor being less than a first crest factor threshold, the finite state machine determines that the heart rate state is the alert state and resets the recovery count value to zero. Otherwise, the finite state machine determines that the heart rate state is the recovery state, and in response to the crest factor being greater than or equal to the first crest factor threshold, the recovery count value is incremented by one.

In some embodiments, a dynamic heart rate value detection method includes: obtaining a crest factor and an estimated heart rate according to a plurality of dynamic heart rate signals of a sampling parameter; obtaining a weight according to the crest factor and the estimated heart rate; and obtaining a dynamic heart rate value according to the weight and the estimated heart rate.

DETAILED DESCRIPTION

Various embodiments are described in detail below. However, the embodiments are merely used as examples for description and do not limit or reduce the protection scope of the present invention. In addition, some elements are omitted in the drawings in the embodiments to clearly show the technical features of the present invention. The same reference numeral is used to indicate the same or similar elements in all of the drawings.

Figure 1:
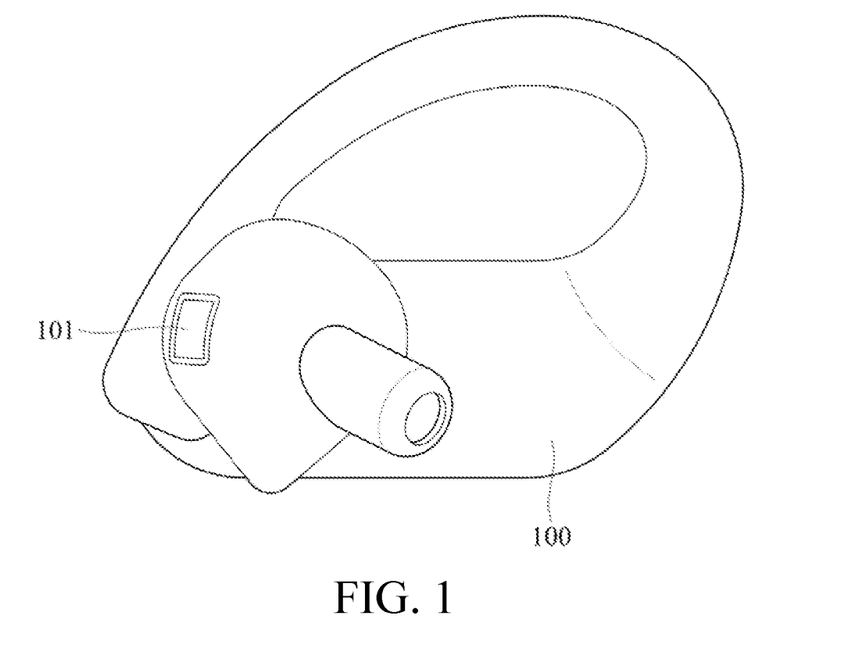
FIG. 1 is a perspective view of a wearable device according to some embodiments of the present invention.
Figure 2:
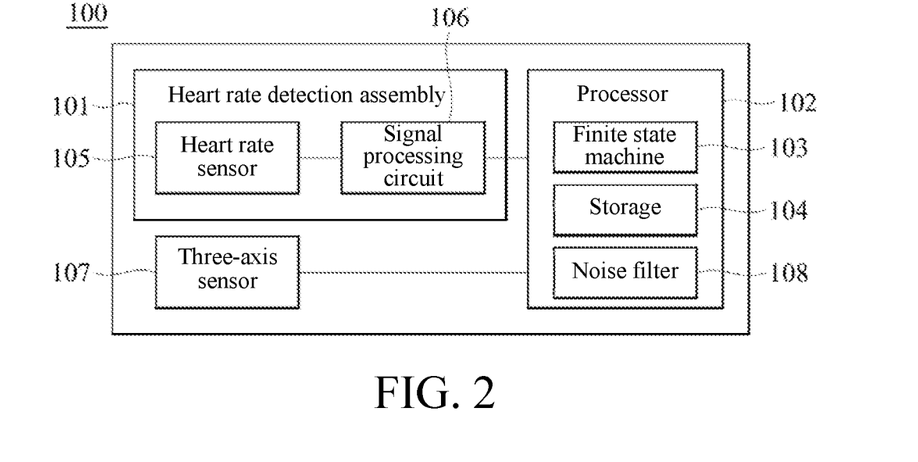
FIG. 2 is a system block diagram of a wearable device according to some embodiments of the present invention.

FIG. 1 is a perspective view of a wearable device according to some embodiments of the present invention. FIG. 2 is a system block diagram of a wearable device according to some embodiments of the present invention. As shown in FIG. 1, in some embodiments, a wearable device with heart rate detection 100 includes a heart rate detection assembly 101 and a processor 102. The heart rate detection assembly 101 is configured to obtain a plurality of dynamic heart rate signals according to a default frequency. The processor 102 includes a finite state machine (FSM) 103 and a storage 104. The storage 104 is configured to store the plurality of dynamic heart rate signals, and the finite state machine 103 determines a heart rate state according to a sampling parameter and the plurality of dynamic heart rate signals. The processor 102 obtains a weight according to the heart rate state, and obtains a dynamic heart rate value according to the weight.

In some embodiments, the wearable device with heart rate detection 100 may be, but is not limited to, an electronic device such as a headset, a wristband, or a watch. In FIG. 1, the wearable device with heart rate detection 100 is a headset, where a part of the heart rate detection assembly 101 is exposed on the headset (described later), so that the heart rate detection assembly 101 may measure the dynamic heart rate signals of the user after the user wears the wearable device with heart rate detection 100 (headset). In some embodiments, the wearable device with heart rate detection 100 may be connected to a mobile information device to transmit the obtained dynamic heart rate value to the mobile information device for display, so that the user can check the dynamic heart rate value in real time. The mobile information device may be, but is not limited to, a tablet computer, a mobile phone or a notebook computer.

In some embodiments, as shown in FIG. 2, the heart rate detection assembly 101 includes a heart rate sensor 105 and a signal processing circuit 106. The heart rate sensor 105 may be a photoplethysmography (PPG) sensor, configured to obtain a photoplethysmography signal (hereinafter referred to as a dynamic heart rate signal). The heart rate sensor 105 may be exposed on the wearable device with heart rate detection 100. In an operating state, the heart rate sensor 105 may obtain a plurality of dynamic heart rate signals according to the default frequency, and transmit the measured dynamic heart rate signals to the signal processing circuit 106 for processing. In some embodiments, the default frequency may be a fixed frequency or a variable frequency. The fixed frequency is, for example, but is not limited to, that 10, 30, 50, 60, or 80 dynamic heart rate signals are obtained per second. The signal processing circuit 106 is configured to receive the dynamic heart rate signals measured by the heart rate sensor 105, and perform, for example, but not limited to, various signal processing operations such as analog-to-digital transform, amplification, and filtering on the dynamic heart rate signals. The signal processing circuit 106 may be an analog front end circuit, and the signal processing circuit 106 may filter the plurality of dynamic heart rate signals according to a preprocessing band. Next, the processor 102 performs time domain to frequency domain transform on the filtered dynamic heart rate signals in a sampling section to obtain a frequency domain signal (described later). The preprocessing band may be a proper range of the human heart rate, and the preprocessing band is, for example, but is not limited to, 50 BPM (bit per minute, 50 bits per minute) to 240 BPM. Accordingly, the signal processing circuit 106 first filters out the dynamic heart rate signals in a non-human heart rate range according to the preprocessing band (50 BPM to 240 BPM), so as to prevent non-heart rate signals (such as motion noise) from interfering with the dynamic heart rate signals.

In some embodiments, the storage 104 may be, but is not limited to, a volatile memory (for example, a random access memory (RAM)), a volatile memory (for example, read-only memory (ROM)), a hard disk drive (HDD), or a solid-state disk (SSD). The storage 104 may store a plurality of dynamic heart rate signals continuously measured by the heart rate sensor 105 and the dynamic heart rate value obtained by the processor 102 according to the estimated heart rate and the heart rate state.

In some embodiments, the sampling parameter includes a sampling frequency and a sampling section. The sampling frequency refers to a frequency (how often the dynamic heart rate value is calculated) at which the processor 102 calculates the heart rate. For example, the sampling frequency is once every 2 seconds, which means that the processor 102 updates the dynamic heart rate value every 2 seconds. The sampling section refers to a time length of the dynamic heart rate signal to be used by the processor 102 each time the processor 102 calculates the heart rate. For example, the sampling section is 6 seconds, which means that the processor 102 uses the dynamic heart rate signal with a time length of 6 seconds as calculated data content each time the processor 102 calculates the heart rate. For start and end points of the 6-second sampling section, a time point in response to the processor 102 calculates the heart rate being the end point, and the start point is 6 seconds ahead of the end point. For example, if a calculation time point of the processor 102 is 10:5:20, the sampling section is the dynamic heart rate signals from 10:5:14 to 10:5:20. However, the present invention is not limited thereto, and the start and end points of the sampling section may also be adjusted as required. In addition, in some embodiments, the sampling section may also use the quantity of data as a unit, for example, is the latest 300 pieces of dynamic heart rate signal data at the calculation time point. The default frequency of the heart rate sensor 105 being 50 times per second is used as an example. 300 pieces of dynamic heart rate signal data correspond to the 6-second sampling section.

In another example in which the heart rate sensor 105 has obtained 10-second dynamic heart rate signals, at the 6th second, the processor 102 updates the dynamic heart rate signals once according to the sampling frequency (2 seconds), and in this case, the processor 102 captures the dynamic heart rate signals from the 0th second to the 6th second from the storage 104 according to the sampling section (6 seconds). Under the condition that the heart rate sensor 105 continuously obtains the dynamic heart rate signals, although the processor 102 updates the dynamic heart rate value with 2 seconds of sampling frequency, the latest 6-second dynamic heart rate signals are used in each calculation, so that the stability and accuracy in determining the heart rate are increased. The sampling frequency and the sampling section are not limited to the foregoing examples, and the designer can make adjustments according to requirements or applications.

In some embodiments, at an initial moment, the heart rate sensor 105 may measure the dynamic heart rate signals of the user for a period of time in response to the user being in a static state, and store the dynamic heart rate signals in the storage 104. The processor 102 then performs sampling according to the sampling frequency, so that in response to the wearable device with heart rate detection 100 with heart rate detection initially operating, the processor 102 can obtain data of the dynamic heart rate signals in the set sampling section, where the static measurement at the initial moment may be, but is not limited to, 5 seconds.

Figure 3:
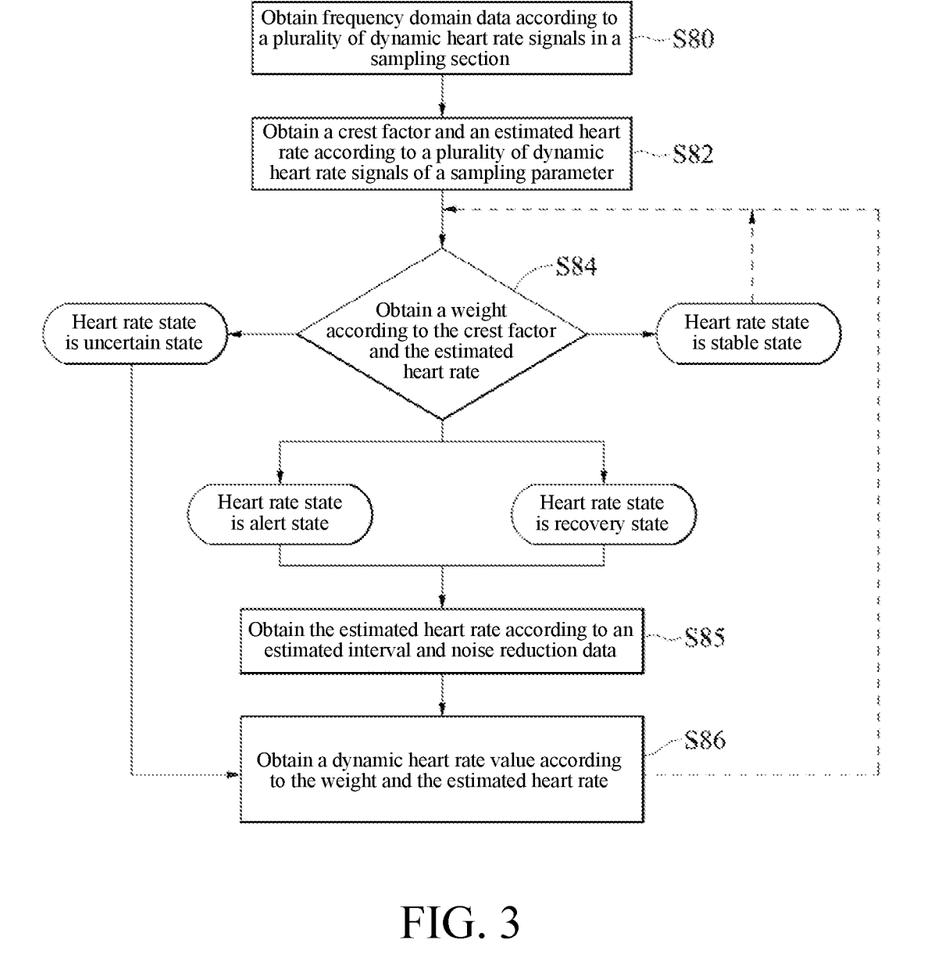
FIG. 3 is a flowchart of a dynamic heart rate detection method according to some embodiments of the present invention.

FIG. 3 is a flowchart of a dynamic heart rate detection method according to some embodiments of the present invention. The processor 102 at the sampling frequency is configured to obtain a current dynamic heart rate value according to the following dynamic heart rate detection method:

Step S82. Obtain a crest factor and an estimated heart rate according to a plurality of dynamic heart rate signals of a sampling parameter.

Step S84. Obtain a weight according to the crest factor and the estimated heart rate.

Step S86. Obtain a dynamic heart rate value according to the weight and the estimated heart rate.

In some embodiments, the heart rate detection method further includes step S80 of obtaining frequency domain data according to the plurality of dynamic heart rate signals in a sampling section. The processor 102 performs time domain to frequency domain transform on the plurality of dynamic heart rate signals (for example, 6-second time domain signals) in the sampling section at a sampling time point (according to the sampling frequency) to obtain the frequency domain data. The time domain to frequency domain transform may be, but is not limited to, fast Fourier transform (FFT) or Fourier transform. The processor 102 transforms the dynamic heart rate signals in time domain into frequency domain data according to the fast Fourier transform.

Figure 4A:
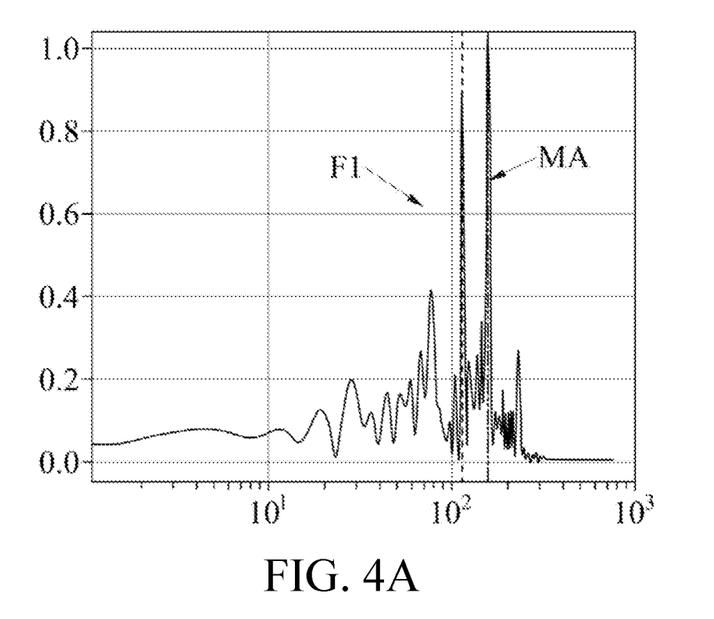
FIG. 4A is a diagram of frequency domain data with motion noise not removed.
Figure 4B:
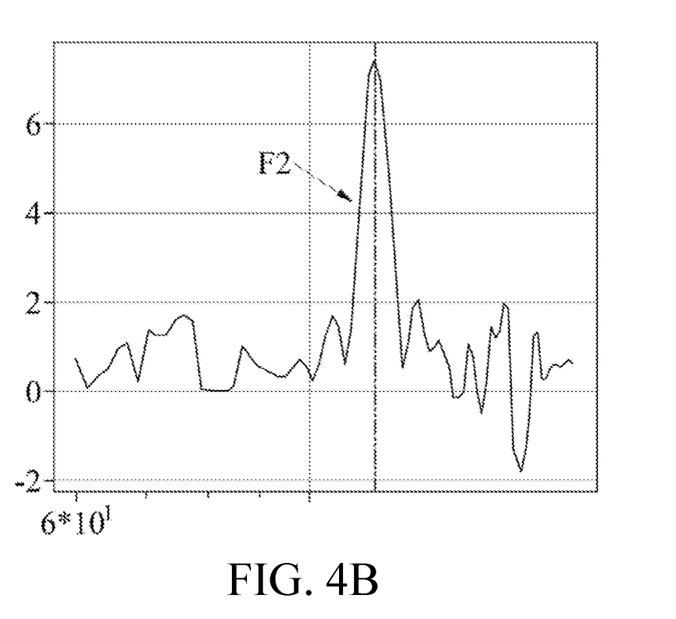
FIG. 4B is a diagram of noise reduction data obtained after motion noise is removed according to FIG. 4A.

Referring to FIG. 4A and FIG. 4B together, FIG. 4A is a diagram of frequency domain data with motion noise not removed. FIG. 4B is a diagram of noise reduction data obtained after motion noise is removed according to FIG. 4A. As shown in FIG. 4A, after the processor 102 obtains frequency domain data F1 (step S80), the frequency domain data F1 at this moment includes motion noise MA. The step S82 of obtaining a crest factor and an estimated heart rate according to a plurality of dynamic heart rate signals of a sampling parameter further includes: obtaining the frequency domain data F1 according to the plurality of dynamic heart rate signals in a sampling section, performing noise reduction processing on the frequency domain data F1 to obtain noise reduction data, and obtaining the crest factor and the estimated heart rate according to the noise reduction data, where the performing noise reduction processing on the frequency domain data F1 to obtain noise reduction data may be removing the motion noise MA in the frequency domain data F1. Referring to FIG. 2 again, the wearable device with heart rate detection 100 further includes a three-axis sensor 107, and the three-axis sensor 107 is configured to obtain three-axis motion data. In response to the user wearing the wearable device with heart rate detection 100, the three-axis sensor 107 detects a motion state of the user, and records the motion state as the three-axis motion data. The obtained three-axis motion data may be regarded as the motion noise MA. The processor 102 obtains noise reduction data F2 (as shown in FIG. 4B) according to the three-axis motion data and the frequency domain data F1. The processor 102 includes a noise filter 108, and obtains the noise reduction data F2 according to the noise filter 108, the three-axis motion data, and the frequency domain data F1, where the noise filter 108 obtains the noise reduction data F2 according to the following formula:

$$W(f) = \frac{P_{XX}(f) - P_{NN}(f)}{P_{XX}(f)} = \frac{P_{SS}(f)}{P_{SS}(f) + P_{NN}(f)},$$

where
  W(f) is the noise filter;
  $P_{XX}(f)$ is the frequency domain data;
  $P_{ss}(f)$ is the noise reduction data; and
  $P_{nn}(f)$ is an average value of the three-axis motion data.

The processor 102 may filter out the motion noise MA (that is, the three-axis motion data) included in the frequency domain data F1 through the noise filter 108, so that the processor 102 may obtain the crest factor and the estimated heart rate according to the noise reduction data F2 (step S82). In addition, the three-axis motion data has been filtered out from the noise reduction data F2, so that the storage burden of the storage 104 can be reduced. The crest factor (CF) is the ratio of a crest to an overall waveform, and may be used as a signal quality indicator for the estimated heart rate. The processor 102 may obtain the crest factor according to the following formula:

$$CF(i) = \frac{x_{peak}(i)}{x_{rms}(i)},$$

where:
  CF(i) is the crest factor of the current estimated heart rate;
  $x_{peak}(i)$ is a peak value of the current estimated heart rate; and
  $x_{rms}(i)$ is a root mean square value of the current estimated heart rate.

In some embodiments, the noise filter 108 is a Wiener filter. The Wiener filter is a filtering system based on a minimum mean-square error (MMSE), and filters out noise (the motion noise MA) and interference from input data, so as to extract the noise reduction data F2 required by the processor 102. The principle of the Wiener filter is: Assuming that the noise is a stable random signal, a difference between an expected output and an actual output is an error, and a mean square error of the error is calculated. The smaller the mean square error, the better the noise filtering effect. The Wiener filter may be derived from the formula X(f)=S(f)+N(f). X(f) represents an input signal (that is, the frequency domain data F1 including the motion noise MA) interfered by the motion noise MA, S(f) represents a signal (that is, the estimated heart rate) that is not interfered by the motion noise MA, and N(f) represents the noise (that is, the motion noise MA). The estimated heart rate given by the Wiener filter is:

$$\tilde{S}(f) = X(f) - N(f) = \left(1 - \frac{N(f)}{X(f)}\right)X(f) = W(f)X(f)$$

The Wiener filter in frequency domain is:

$$W(f) = \frac{P_{XX}(f) - P_{NN}(f)}{P_{XX}(f)} = \frac{P_{SS}(f)}{P_{SS}(f) + P_{NN}(f)}$$

where $P_{XX}(f)$ represents spectral energy (that is, the frequency domain data F1) of the dynamic heart rate signals interfered by the motion noise MA. $P_{SS}(f)$ represents spectral energy (that is, the noise reduction data F2) of the dynamic heart rate signals not interfered by the motion noise MA. $P_{NN}(f)$ represents spectral energy of the motion noise MA, which is an average value (that is, the motion noise MA) of the three-axis motion data.

In some embodiments, the noise filter 108 is formed by a plurality of Wiener filters, as follows:

$$w_1(t, k) = 1 - \frac{P_{NN}(t, k)}{\frac{1}{C}\Sigma_{i=t-C+1}^{t} P_{XX}(i, k)}$$

$$w_2(t, k) = \frac{\frac{1}{C}\Sigma_{i=t-C+1}^{t} w_2(i, k) P_{XX}(i, k)}{\frac{1}{C}\Sigma_{i=t-C+1}^{t} w_2(i, k) P_{XX}(i, k) + P_{NN}(i, k)}$$

where according to the Wiener filter ($w_1$), $w_1(t, k)$ represents that a parameter of the Wiener filter at a kth frequency point, and a time t, and spectral energy are normalized to a maximum value to ensure consistency between an estimated input and the noise. In the two Wiener filters, average first C spectral envelopes of an input signal can be seen. In some embodiments, C may refer to 15 spectral envelopes. According to the Wiener filter $w_2$, $w_2$ is a spectrum (that is, the noise reduction data F2) that is not interfered by the motion noise MA, and may be obtained by averaging the calculated Wiener filter output. Parameters of the two Wiener filters are divided by their own standard deviations, and output results of the two Wiener filters are combined to obtain a spectrum of the dynamic heart rate signals not interfered by the motion noise MA.

The step of obtaining the crest factor and the estimated heart rate according to the noise reduction data F2 includes: obtaining the estimated heart rate according to an estimated interval and the noise reduction data F2. The estimated interval may be a fixed value, or may be adjusted according to a heart rate state (described later). The processor 102 may set an estimated interval in the noise reduction data F2, and capture the heart rate of the noise reduction data F2 within the estimated interval as the estimated heart rate.

Figure 5:
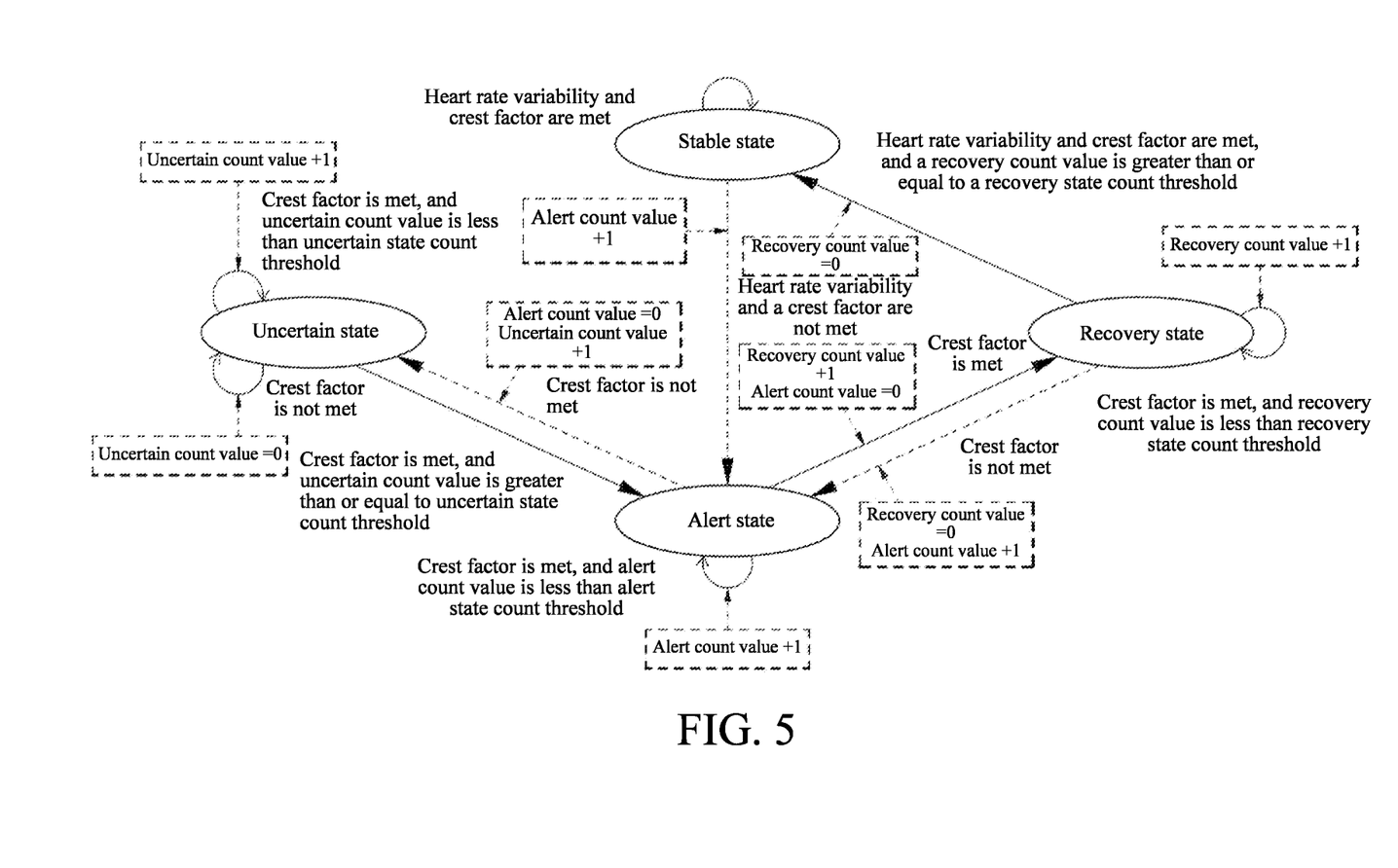
FIG. 5 is a flowchart of state determining of a finite state machine according to some embodiments of the present invention.

FIG. 5 is a flowchart of state determining of a finite state machine according to some embodiments of the present invention. The step S84 of obtaining a weight according to the crest factor and the estimated heart rate further includes: obtaining a heart rate state according to the crest factor and the estimated heart rate, where the heart rate state includes a stable state, an alert state, a recovery state, and an uncertain state and obtaining the weight according to the heart rate state. In some embodiments, the processor 102 obtains the heart rate state through the finite state machine 103, where the finite state machine 103 is configured to determine that the heart rate state is the stable state at an initial moment. The processor 102 at the sampling frequency determines the heart rate state according to the plurality of dynamic heart rate signals in the sampling section, and the finite state machine 103 obtains the crest factor and the estimated heart rate according to the continuous sampling section.

In some embodiments, in a case that the heart rate state is the stable state, it is determined that the heart rate state is the alert state or the stable state according to a heart rate variability and the crest factor of the plurality of dynamic heart rate signals. In a case that the heart rate state is the alert state, it is determined that the heart rate state is the uncertain state or the recovery state according to the crest factor of the plurality of dynamic heart rate signals. In a case that the heart rate state is the uncertain state, it is determined that the heart rate state is the uncertain state or the alert state according to the crest factor of the plurality of dynamic heart rate signals. In a case that the heart rate state is the recovery state, it is determined that the heart rate state is the alert state or the stable state according to the heart rate variability and the crest factor of the plurality of dynamic heart rate signals.

The heart rate variability may be a difference between the estimated heart rate and the real dynamic heart rate. In some embodiments, the processor 102 includes a heart rate variability threshold. The heart rate variability threshold may be obtained according to the sampling frequency. The heart rate variability threshold may also be determined by experiments. In some embodiments, the heart rate variability threshold is between 5 BPM and 13 BPM. The heart rate variability threshold being 5 BPM is used as an example for the following description. Referring to H. Chung, H. Lee and J. Lee, "Finite State Machine Framework for Instantaneous Heart Rate Validation Using Wearable Photoplethysmography During Intensive Exercise," in IEEE Journal of Biomedical and Health Informatics, vol. 23, no. 4, the paper is the research about the trend of the heart rate variability. In the paper, through observation according to 3, 204 samples, for the heart rate variability within 2 seconds, the heart rate variability of 99% of people is 5.025 BPM; for the heart rate variability within 4 seconds, the heart rate variability of 99% of people is 9.180 BPM; and for the heart rate variability within 6 seconds, the heart rate variability of 99% of people is 12.894 BPM. Therefore, if the sampling frequency is set to once every 2 seconds, and if the measured heart rate variability is within 5.025 BPM, it means that the measured heart rate has a high trust degree. Accordingly, in some embodiments, the processor 102 may set the heart rate variability threshold to 5 BPM according to the sampling frequency.

Figure 6:
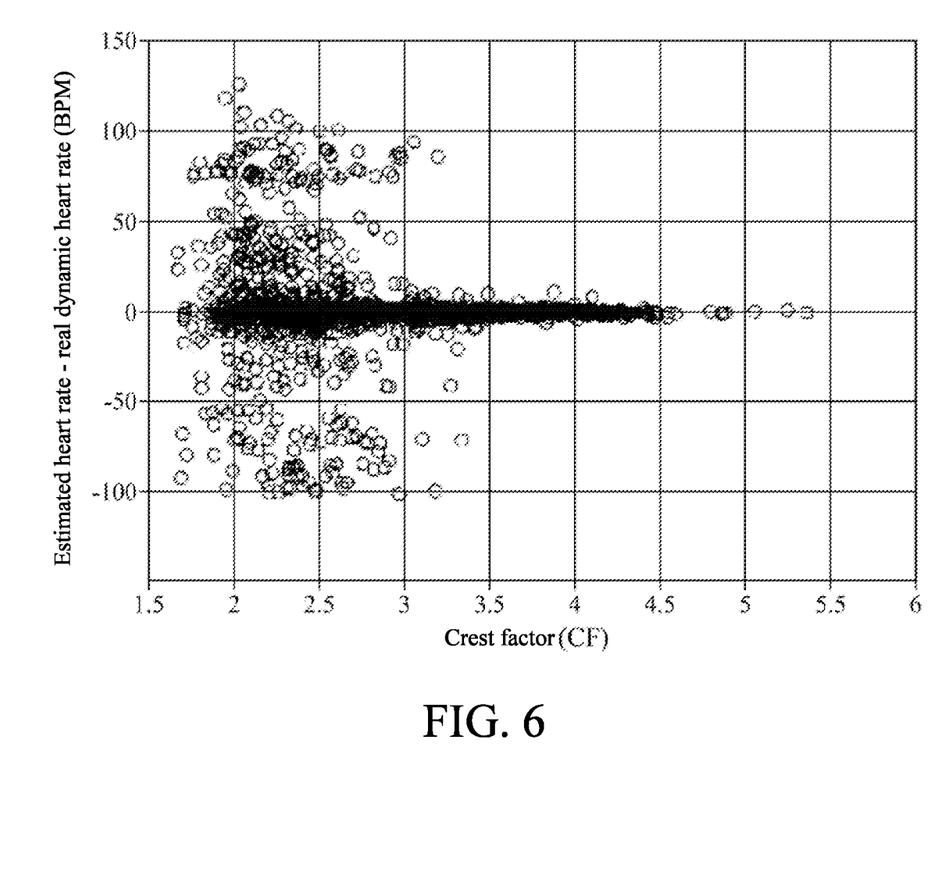
FIG. 6 is a diagram showing a relationship between a heart rate error and a crest factor according to some embodiments of the present invention.

In some embodiments, the crest factor may be 4. FIG. 6 is a diagram showing a relationship between a heart rate error and a crest factor according to some embodiments of the present invention, where a horizontal axis is the crest factor, and a vertical axis is the heart rate variability, that is, the difference between the estimated heart rate and the real dynamic heart rate. In response to the crest factor (the horizontal axis in the figure) growing higher, variation of the heart rate variability (the vertical axis in the figure) grows smaller. It can be seen from the figure that in response to the crest factor being 2, the heart rate variability has a large variation range (or an error range), that is, the signal quality of the estimated heart rate is poor. In response to the crest factor being 4, the variation of the heart rate variability is relatively small, that is, the signal quality of the estimated heart rate is relatively good.

As shown in FIG. 5 again, in a case that the heart rate state is the stable state, in response to the heart rate variability being less than or equal to the heart rate variability threshold, and the crest factor is greater than or equal to the crest factor threshold, the finite state machine 103 determines that the heart rate state is the stable state. Otherwise, in response to the foregoing conditions being not met, the finite state machine 103 determines that the heart rate state is the alert state, where the heart rate variability is a difference (the difference is an absolute value) between a dynamic heart rate value and a dynamic heart rate value at a previous moment. For example, after the finite state machine 103 obtains the current estimated heart rate, in response to the heart rate variability of the current estimated heart rate (the first estimated heart rate) being 6 and the crest factor is 4, because both the heart rate variability and the crest factor of the currently estimated heart rate meet the conditions, the finite state machine 103 determines that the heart rate state is the stable state. After the finite state machine 103 obtains the estimated heart rate at a next moment, in response to the heart rate variability of the estimated heart rate being 7 and the crest factor is 3, because the estimated heart rate at the next moment (the second estimated heart rate) does not meet the conditions, the finite state machine 103 determines that the estimated heart rate at the next moment is in the alert state. In short, the estimated heart rate determined to be the stable state needs to meet the conditions of both the heart rate variability and the crest factor. If one of the conditions is not met, the finite state machine 103 changes the heart rate state from the stable state to the alert state.

In some embodiments, in a case that the heart rate state is the alert state, in response to the crest factor being less than the crest factor threshold, and an alert count value reaches an alert state count threshold, the finite state machine 103 determines that the heart rate state is the uncertain state and resets the alert count value to zero. In response to the crest factor being greater than or equal to the crest factor threshold, the finite state machine 103 determines that the heart rate state is the recovery state and resets the alert count value to zero. Otherwise, in response to neither of the foregoing conditions being met, the finite state machine 103 determines that the heart rate state is the alert state, and in response to the crest factor being less than the crest factor threshold, the alert count value is incremented by one. In some embodiments, a count unit of the alert count value may be 2 seconds. In some embodiments, in response to the finite state machine 103 being initialized, the finite state machine 103 may first reset the alert count value to zero, so as to avoid that the alert count value stores the determining of the previous count record interfering with the heart rate state during initialization. In some embodiments, the alert state count threshold may be 5, and a unit may be second. For example, in a case that the heart rate state is determined to be the alert state, the alert count value is incremented by one, that is, the alert count value is counted to 2 seconds. After next two seconds, and after the finite state machine 103 obtains the current estimated heart rate (the first estimated heart rate), and the crest factor does not meet the conditions, the alert count value continues to count. In this case, the alert count value has altogether counted up to 4 seconds, the finite state machine 103 obtains the estimated heart rate at the next moment (the second estimated heart rate), the crest factor of the estimated heart rate at the next moment still does not meet the conditions, and the alert count value continues to count. In this case, the alert count value has altogether counted up to 6 seconds. Because the alert count value has reached the alert state count threshold, the finite state machine 103 determines that the heart rate state is changed from the alert state to the uncertain state, and clears the alert count value. In some embodiments, in the alert state, in response to the alert count value having not reached the alert state count threshold and the crest factor has met the conditions, the finite state machine 103 changes the heart rate state from the alert state to the recovery state, adds the recovery count value by one, and clears the alert count value.

In some embodiments, in a case that the heart rate state is the uncertain state, in response to the crest factor being greater than or equal to the crest factor threshold, and an uncertain count value reaches an uncertain state count threshold, the finite state machine 103 determines that the heart rate state is the alert state and resets the uncertain count value to zero. In response to the crest factor being less than the crest factor threshold, the finite state machine 103 determines that the heart rate state is the uncertain state and resets the uncertain count value to zero. Otherwise, in response to neither of the foregoing conditions being met, the finite state machine 103 determines that the heart rate state is the uncertain state, and in response to the crest factor being greater than or equal to the crest factor threshold, the uncertain count value is incremented by one. In some embodiments, the uncertain state count threshold may be 3, and a unit may be second. In some embodiments, a count unit of the uncertain count value may be 2 seconds. For example, in a case that the heart rate state is determined to be the uncertain state, the uncertain count value is incremented by one, that is, the uncertain count value is counted to 2 seconds. In response to the finite state machine 103 obtaining the estimated heart rate at the next moment (the second estimated heart rate), and the crest factor of the estimated heart rate at the next moment still does not meet the conditions, the finite state machine 103 clears the uncertain count value. If the crest factor of the estimated heart rate at the next second moment (the third estimated heart rate) meets the conditions, the uncertain count value is incremented by one. If the crest factor of the estimated heart rate at the next moment (the second estimated heart rate) meets the conditions, the uncertain count value is incremented by one. In this case, the uncertain count value has altogether counted up to 2. That is, after waiting in the uncertain state for 4 seconds and reaching the uncertain state count threshold, the finite state machine 103 determines that the heart rate state is changed from the uncertain state to the alert state, adds the alert count value by one, and clears the uncertain count value.

In some embodiments, in a case that the heart rate state is the recovery state, in response to the crest factor being greater than or equal to the crest factor threshold, the heart rate variability is less than or equal to the heart rate variability threshold, and a recovery count value reaches a recovery state count threshold, the finite state machine 103 determines that the heart rate state is the stable state and resets the recovery count value to zero. In response to the crest factor being less than the crest factor threshold, the finite state machine 103 determines that the heart rate state is the alert state and resets the recovery count value to zero. Otherwise, in response to neither of the foregoing conditions being met, the finite state machine 103 determines that the heart rate state is the recovery state, and in response to the crest factor being greater than or equal to the crest factor threshold, the recovery count value is incremented by one. In some embodiments, the recovery state count threshold may be 4, and a unit may be second. In some embodiments, a count unit of the recovery count value may be 2 seconds. For example, in a case that the heart rate state is determined to be the recovery state, the recovery count value is incremented by one, that is, the uncertain count value is counted to 2 seconds. In response to the finite state machine 103 obtaining the estimated heart rate at the next moment (the second estimated heart rate), and the crest factor of the estimated heart rate at the next moment still meets the conditions, the recovery count value is incremented by one. In this case, the recovery count value has altogether counted up to 2. That is, after waiting in the uncertain state for 4 seconds and reaching the recovery state count threshold, and the heart rate variability is less than or equal to the heart rate variability threshold, the finite state machine 103 determines that the heart rate state is the stable state, and clears the recovery count value. In some embodiments, if the crest factor of the estimated heart rate at the next moment (the second estimated heart rate) does not meet the conditions, the finite state machine 103 determines that the heart rate state is the alert state, adds the alert count value by one, and clears the recovery count value.

For the step S84 of obtaining the weight according to the heart rate state, the processor 102 obtains different weights according to different heart rate states. That is, after the finite state machine 103 determines the heart rate state for the estimated heart rate, the processor 102 may obtain the weight corresponding to the heart rate state according to the estimated heart rate under different heart rate states. Next, the processor 102 may obtain the dynamic heart rate value according to the estimated heart rate and the weight (described later). In some embodiments, in a case that the heart rate state is the uncertain state, the weight is 1. In a case that the heart rate state is the alert state, the weight is greater than or equal to 0.8 and less than 1. In a case that the heart rate state is the recovery state, the weight is greater than or equal to 0.3 to less than or equal to 0.5. In a case that the heart rate state is the stable state, the weight is 0.

For the step S86 of obtaining a dynamic heart rate value according to the weight and the estimated heart rate, the processor 102 may obtain the dynamic heart rate value according to the following formula:

$$HR_{est}=W*HR_{linReg}+(1-W)*HR_{cur}, \text{ where}$$

$HR_{est}$ is the dynamic heart rate value,
W is the weight,
$HR_{linReg}$ is the dynamic heart rate value at the previous moment, and
$HR_{cur}$ is the estimated heart rate.

As shown in FIG. 3 again, after the step S84 of obtaining a heart rate state according to the crest factor and the estimated heart rate ends, the dynamic heart rate detection method further includes step S85 of obtaining the estimated heart rate according to an estimated interval and the noise reduction data F2.

Figure 7:
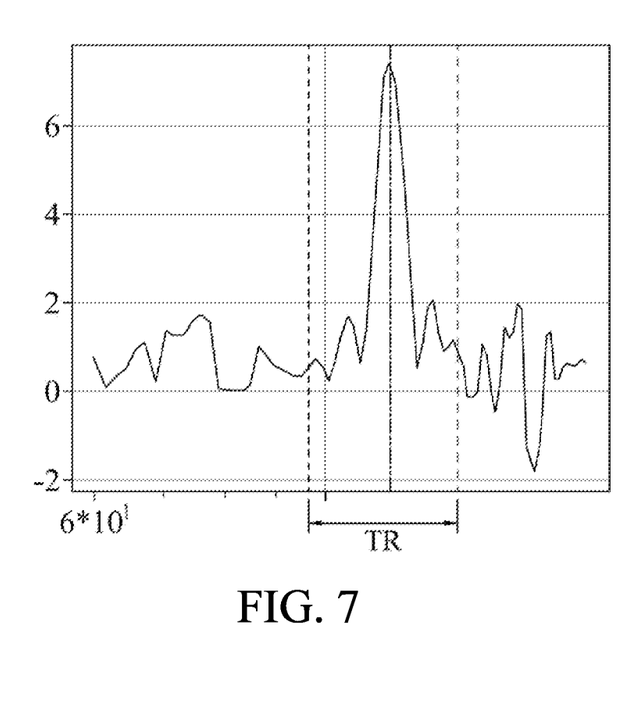
FIG. 7 is a schematic diagram of an estimated interval according to some embodiments of the present invention.

The estimated interval may be adjusted according to the alert state and the recovery state. FIG. 7 is a schematic diagram of an estimated interval according to some embodiments of the present invention. In some embodiments, an estimated interval TR may be adjusted according to the heart rate state. In a case that the heart rate state is the alert state or the recovery state, the finite state machine 103 adjusts an estimated interval TR according to a maximum heart rate error between the two consecutive dynamic heart rate values at the previous moment. In response to the dynamic heart rate value at the previous moment being less than the heart rate variability threshold (indicating that the dynamic heart rate changes intensely at the previous moment), the estimated interval TR is expanded, and in response to the dynamic heart rate value at the previous moment being greater than or equal to the heart rate variability threshold (indicating that the heart rate variation is stable), the estimated interval TR is reduced. The estimated interval TR may be greater than or equal to ±5 BPM. In some embodiments, the estimated interval TR may be obtained according to the following formula:

$$\tau_i=\max\{|HR(t)-HR(t-1)|:S<t<i\}\pm 5 \text{ BPM, where}$$

$\tau_i$ is the estimated interval;
HR(t) is the dynamic heart rate value at the previous moment;
HR(t−1) is the dynamic heart rate value at the next moment;
t is a time at the previous moment;
i is a current time; and
S is a default range of the time at the previous moment. In some embodiments, S may be 30 seconds.

Figure 8:
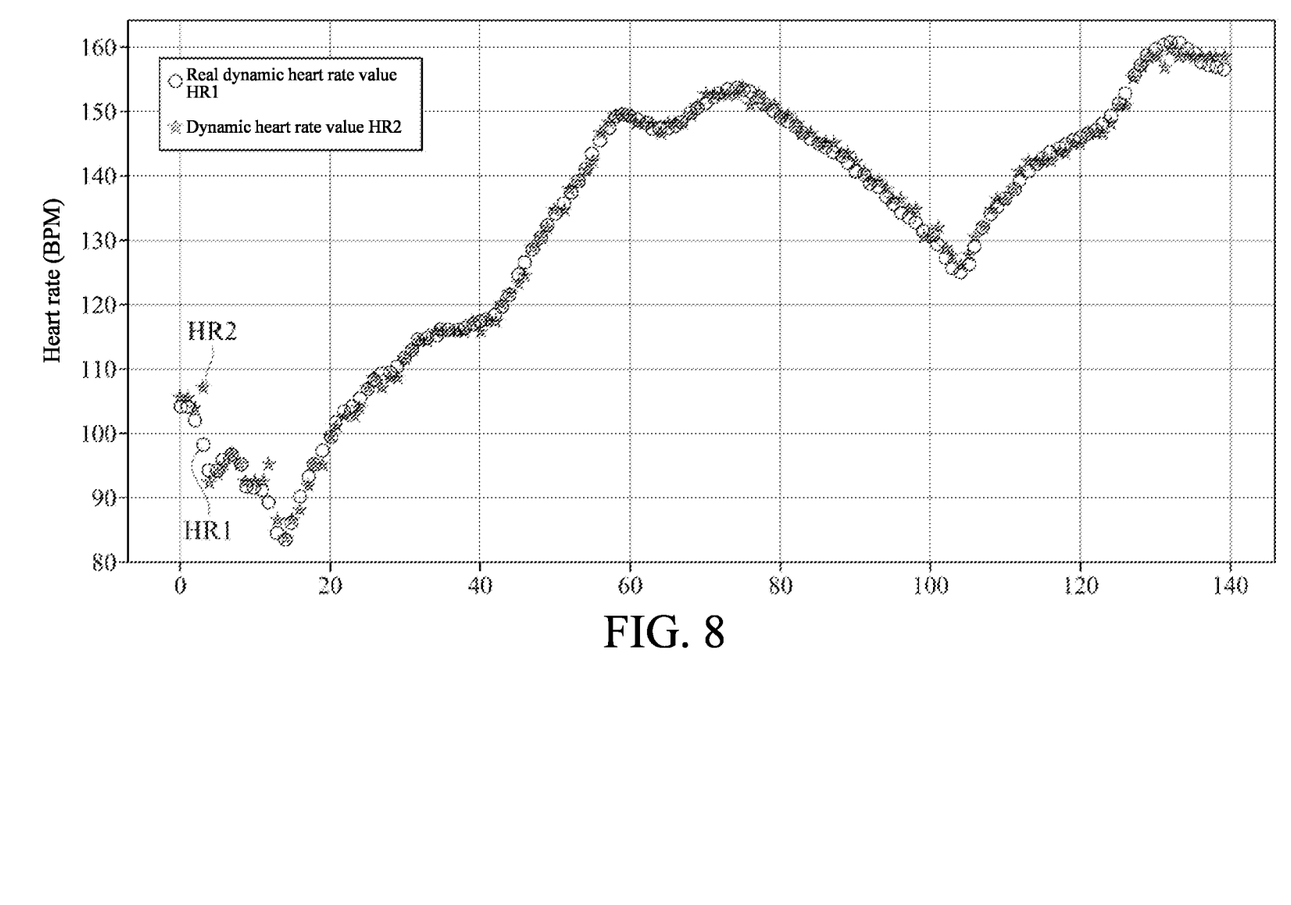
FIG. 8 is a data comparison diagram of a dynamic heart rate value and a real dynamic heart rate according to some embodiments of the present invention.
Figure 9:
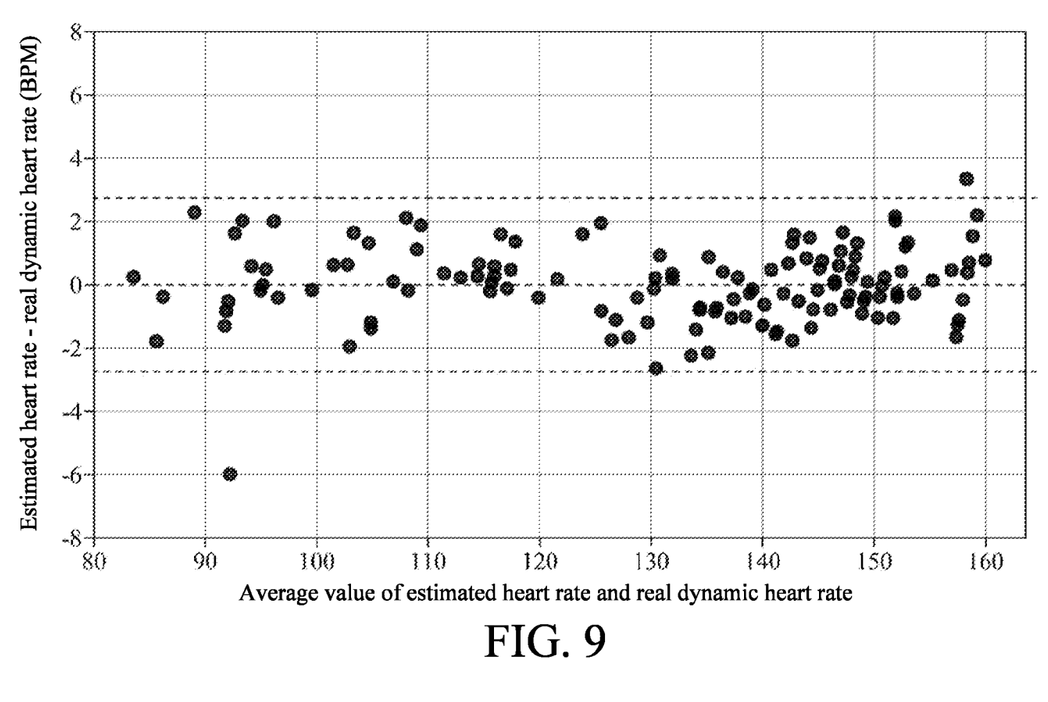
FIG. 9 is a Bland-Altman difference plot of a dynamic heart rate value and a real dynamic heart rate value according to some embodiments of the present invention.

FIG. 8 is a data comparison diagram of a dynamic heart rate value and a real dynamic heart rate value according to some embodiments of the present invention. As shown in FIG. 8, a real dynamic heart rate HR1 and a dynamic heart rate HR2 are marked, where the real dynamic heart rate HR1 is a heart rate map of a subject monitored by electrocardiography (ECG), and the real dynamic heart rate HR1 may be regarded as the dynamic heart rate value of the subject in a real state. The dynamic heart rate value HR2 is the dynamic heart rate value HR2 obtained by the processor 102 in the dynamic heart rate detection method. As shown in FIG. 8, according to the heart rate variation data within 2 seconds, after the dynamic heart rate value HR2 is compared with the real dynamic heart rate HR1, it can be seen that the dynamic heart rate value HR2 and the real dynamic heart rate HR1 are almost the same. The dynamic heart rate value HR2 obtained by the processor 102 according to the heart rate detection method may be regarded to be the same as the real dynamic heart rate HR1. FIG. 9 is a Bland-Altman difference plot (Bland-Altman difference plot) of a dynamic heart rate value and a real dynamic heart rate value according to some embodiments of the present invention. FIG. 9 shows an average error between the estimated heart rate and the real dynamic heart rate. Upper and lower horizontal dotted lines in the figure are upper and lower limits of an upper limit L1 of a difference and a lower limit L2 of the difference that represent upper and lower limits of 95% of the difference. A dotted line in the middle is an average value L3 of the difference, which represents an average value of an error between the estimated heart rate and the real dynamic heart rate HR1. The closer the dotted line in the middle is to 0, the higher the consistency between the real dynamic heart rate HR1 and the estimated heart rate is. It can be seen from the figure that most of the difference between the real dynamic heart rate HR1 and the estimated heart rate falls within 2 BPM.

A non-transitory computer-readable storage medium is configured to store one or more software programs, where the one or more software programs include a plurality of instructions, in response to the plurality of instructions being executed by one or more processing circuits of an electronic device, the electronic device performs a dynamic heart rate detection method, and the dynamic heart rate detection method includes: the step S82 of obtaining a crest factor and an estimated heart rate according to a plurality of dynamic heart rate signals of a sampling parameter; the step S84 of obtaining a weight according to the crest factor and the estimated heart rate; and the step S86 of obtaining a dynamic heart rate value according to the weight and the estimated heart rate.

In summary, according to some embodiments, after the processor distinguishes the stable state, the alert state, the uncertain state and the recovery state from the heart rate state through the finite state machine, the processor can give corresponding weights according to different heart rate states, so that the processor in different states obtains the dynamic heart rate value according to the weight and the estimated heart rate, and the dynamic heart rate value may be close to a real dynamic heart rate value. In addition, after receiving the frequency domain data, the processor can filter out the motion noise of the frequency domain data according to the three-axis motion data to obtain the noise reduction data, and the processor can further obtain the crest factor and the estimated heart rate according to the noise reduction data. Accordingly, the processor can avoid processing the motion noise, reduce the operating burden of the processor, and also reduce the storage space of the storage.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A wearable device with heart rate detection, comprising:
    a heart rate detection assembly, configured to obtain a plurality of dynamic heart rate signals according to a default frequency; and
    a processor, comprising a finite state machine and a storage, wherein the storage is configured to store the plurality of dynamic heart rate signals, and the finite state machine determines a heart rate state according to a sampling parameter and the plurality of dynamic heart rate signals, wherein
    the processor obtains a weight according to the heart rate state, and obtains a dynamic heart rate value according to the weight.

2. The wearable device with heart rate detection according to claim 1, wherein the sampling parameter comprises a sampling frequency and a sampling section, and the processor at the sampling frequency is configured to:
    obtain frequency domain data according to the plurality of dynamic heart rate signals in the sampling section;
    perform noise reduction processing on the frequency domain data to obtain noise reduction data;
    obtain a crest factor and an estimated heart rate according to the noise reduction data; and
    obtain the dynamic heart rate value according to the heart rate state and the estimated heart rate, wherein the heart rate state comprises a stable state, an alert state, a recovery state and an uncertain state.

3. The wearable device with heart rate detection according to claim 2, wherein the processor is configured to obtain the dynamic heart rate value according to the following formula:

$HR_{est} = W*HR_{linReg} + (1-W)*HR_{cur}$, wherein

HRest is the dynamic heart rate value, W is the weight, HRlinReg is a dynamic heart rate value at a previous moment, and $HR_{cur}$ is the estimated heart rate, wherein
in a case that the heart rate state is the uncertain state, W is 1; in a case that the heart rate state is the alert state, W is greater than or equal to 0.8 and less than 1; in a case that the heart rate state is the recovery state, W is greater than or equal to 0.3 to less than or equal to 0.5; and in a case that the heart rate state is the stable state, W is 0.

4. The wearable device with heart rate detection according to claim 3, wherein the finite state machine is configured to determine that the heart rate state is the stable state at an initial moment;
    in a case that the heart rate state is the stable state,
    in response to a heart rate variability being less than or equal to a heart rate variability threshold, and the crest factor is greater than or equal to a crest factor threshold, the finite state machine determines that the heart rate state is the stable state; and
    otherwise, the finite state machine determines that the heart rate state is the alert state, wherein the heart rate variability is a difference between the dynamic heart rate value and the dynamic heart rate value at the previous moment.

5. The wearable device with heart rate detection according to claim 4, wherein in a case that the heart rate state is the alert state,
    in response to the crest factor being less than the crest factor threshold, and an alert count value reaches an alert state count threshold, the finite state machine determines that the heart rate state is the uncertain state and resets the alert count value to zero;
    in response to the crest factor being greater than or equal to the crest factor threshold, the finite state machine determines that the heart rate state is the recovery state and resets the alert count value to zero; and
    otherwise, the finite state machine determines that the heart rate state is the alert state, and in response to the crest factor being less than the crest factor threshold, the alert count value is incremented by one.

6. The wearable device with heart rate detection according to claim 5, wherein in a case that the heart rate state is the uncertain state,
    in response to the crest factor being greater than or equal to the crest factor threshold, and an uncertain count value reaches an uncertain state count threshold, the finite state machine determines that the heart rate state is the alert state and resets the uncertain count value to zero;
    in response to the crest factor being less than the crest factor threshold, the finite state machine determines that the heart rate state is the uncertain state and resets the uncertain count value to zero; and
    otherwise, the finite state machine determines that the heart rate state is the uncertain state, and in response to the crest factor being greater than or equal to the crest factor threshold, the uncertain count value is incremented by one.

7. The wearable device with heart rate detection according to claim 6, wherein in a case that the heart rate state is the recovery state,
    in response to the crest factor being greater than or equal to the crest factor threshold, the heart rate variability is less than or equal to the heart rate variability threshold, and a recovery count value reaches a recovery state count threshold, the finite state machine determines that the heart rate state is the stable state and resets the recovery count value to zero;

in response to the crest factor being less than the crest factor threshold, the finite state machine determines that the heart rate state is the alert state and resets the recovery count value to zero; and otherwise, the finite state machine determines that the heart rate state is the recovery state, and in response to the crest factor being greater than or equal to the crest factor threshold, the recovery count value is incremented by one.

8. The wearable device with heart rate detection according to claim 7, wherein the heart rate detection assembly comprises a signal processing circuit, and the signal processing circuit filters the plurality of dynamic heart rate signals according to a preprocessing band, and the preprocessing band is 50 BPM to 240 BPM.

9. The wearable device with heart rate detection according to claim 8, wherein the processor performs time domain to frequency domain transform on the plurality of dynamic heart rate signals in the sampling section to obtain the frequency domain data.

10. The wearable device with heart rate detection according to claim 9, further comprising a three-axis sensor, wherein the three-axis sensor is configured to obtain three-axis motion data, and the processor obtains the noise reduction data according to the three-axis motion data and the frequency domain data; and the processor comprises a noise filter, and obtains the noise reduction data according to the noise filter, the three-axis motion data and the frequency domain data, wherein the noise filter obtains the noise reduction data according to the following formula:

$$W(f) = \frac{P_{XX}(f) - P_{NN}(f)}{P_{XX}(f)} = \frac{P_{SS}(f)}{P_{SS}(f) + P_{NN}(f)}$$

wherein W(f) is the noise filter, PXX(f) is the frequency domain data, Pss(f) is the noise reduction data, and Pnn(f) is an average value of the three-axis motion data.

11. The wearable device with heart rate detection according to claim 10, wherein in a case that the heart rate state is the alert state or the recovery state, the finite state machine adjusts an estimated interval according to a maximum heart rate error between two consecutive dynamic heart rate values at the previous moment, wherein in response to the dynamic heart rate value at the previous moment being less than the heart rate variability threshold, the finite state machine expands the estimated interval, and in response to the dynamic heart rate value at the previous moment being greater than or equal to the heart rate variability threshold, the finite state machine reduces the estimated interval; and the estimated interval is greater than or equal to ±5 BPM.

12. A dynamic heart rate detection method, comprising:

obtaining, by a processor, a crest factor and an estimated heart rate according to a plurality of dynamic heart rate signals of a sampling parameter;

obtaining, by the processor, a weight according to a heart rate state, including obtaining the heart rate state according to the crest factor and the estimated heart rate; and obtaining, by the processor, a dynamic heart rate value according to the weight and the estimated heart rate.

13. The dynamic heart rate detection method according to claim 12, wherein the step of obtaining a crest factor and an estimated heart rate according to a plurality of dynamic heart rate signals of a sampling parameter comprises:

obtaining frequency domain data according to the plurality of dynamic heart rate signals in a sampling section;

performing noise reduction processing on the frequency domain data to obtain the crest factor and the estimated heart rate; and wherein the heart rate state comprises a stable state, an alert state, a recovery state and an uncertain state.

14. The dynamic heart rate detection method according to claim 13, wherein determine that the heart rate state is the stable state at an initial moment;

in a case that the heart rate state is the stable state, in response to heart rate variability being greater than or equal to a heart rate variability threshold, and the crest factor is greater than or equal to a crest factor threshold, the heart rate state is the stable state; and otherwise, the heart rate state is the alert state.

15. The dynamic heart rate detection method according to claim 14, wherein in a case that the heart rate state is the alert state, in response to the crest factor being less than the crest factor threshold, and an alert count value reaches an alert state count threshold, the heart rate state is the uncertain state and the alert count value is reset to zero;

in response to the crest factor being greater than or equal to the crest factor threshold, the heart rate state is the recovery state and the alert count value is reset to zero; and otherwise, the heart rate state is the alert state, and in response to the crest factor being less than the crest factor threshold, the alert count value is incremented by one.

16. The dynamic heart rate detection method according to claim 15, wherein in a case that the heart rate state is the uncertain state, in response to the crest factor being greater than or equal to the crest factor threshold, and an uncertain count value reaches an uncertain state count threshold, a finite state machine determines that the heart rate state is the alert state and resets the uncertain count value to zero;

in response to the crest factor being less than the crest factor threshold, the finite state machine determines that the heart rate state is the uncertain state and resets the uncertain count value to zero; and otherwise, the finite state machine determines that the heart rate state is the uncertain state, and in response to the crest factor being greater than or equal to the crest factor threshold, the uncertain count value is incremented by one.

17. The dynamic heart rate detection method according to claim 16, wherein in a case that the heart rate state is the recovery state, in response to the crest factor being greater than or equal to the crest factor threshold, and a recovery count value reaches a recovery state count threshold, the finite state machine determines that the heart rate state is the stable state and resets the recovery count value to zero;

in response to the crest factor being less than the crest factor threshold, the finite state machine determines that the heart rate state is the alert state and resets the recovery count value to zero; and otherwise, the finite state machine determines that the heart rate state is the recovery state, and in response to the crest factor being greater than or equal to the crest factor threshold, the recovery count value is incremented by one.

18. The dynamic heart rate detection method according to claim 17, further comprising:
performing time domain to frequency domain transform on the plurality of dynamic heart rate signals in the sampling section to obtain the frequency domain data; and
the step of obtaining a crest factor and an estimated heart rate according to a plurality of dynamic heart rate signals of a sampling parameter comprises:
performing the noise reduction processing on the frequency domain data to obtain noise reduction data, and obtaining the crest factor and the estimated heart rate according to the noise reduction data; and
the step of obtaining the crest factor and the estimated heart rate according to the noise reduction data comprises:
obtaining the estimated heart rate according to an estimated interval and the noise reduction data.

19. The dynamic heart rate detection method according to claim 18, wherein in a case that the heart rate state is the alert state or the recovery state, the estimated interval is adjusted.

20. A non-transitory computer-readable storage medium, storing one or more software programs, wherein the one or more software programs comprise a plurality of instructions, in response to the plurality of instructions being executed by one or more processing circuits of an electronic device, the electronic device performs a dynamic heart rate detection method, and the dynamic heart rate detection method comprises:
obtaining a crest factor and an estimated heart rate according to a plurality of dynamic heart rate signals of a sampling parameter;
obtaining a weight according to a heart rate state, including obtaining the heart rate state according to the crest factor and the estimated heart rate;
and obtaining a dynamic heart rate value according to the weight and the estimated heart rate.

* * * * *